April 2, 1940.  F. J. GEORGE  2,195,484
MOUSE TRAP
Filed Aug. 9, 1937
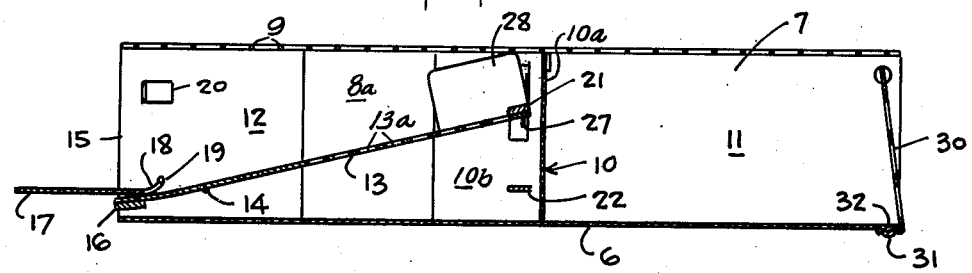
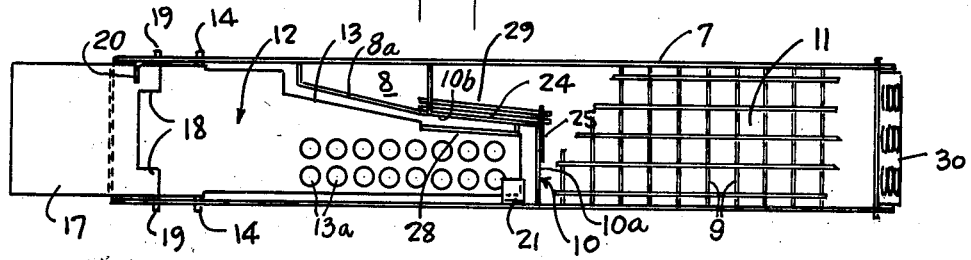
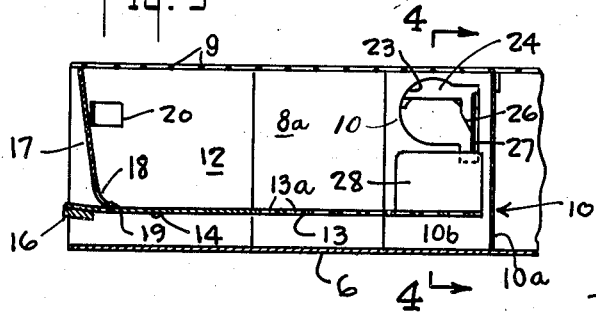
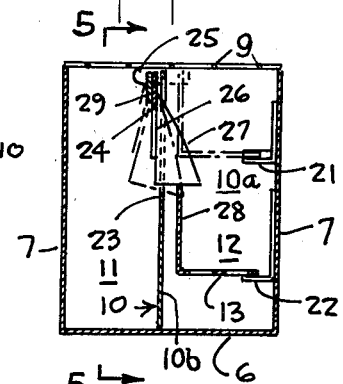
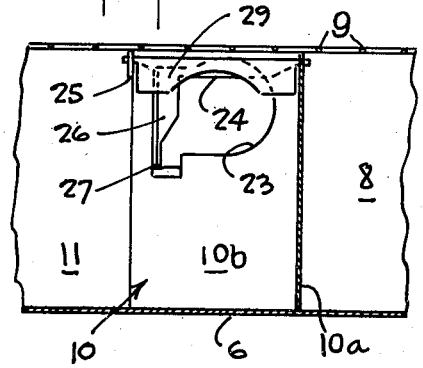
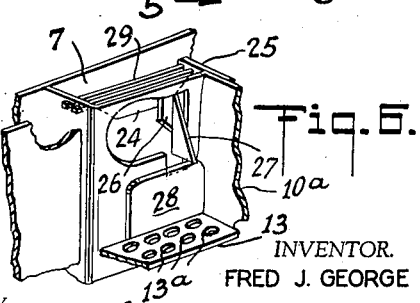
INVENTOR.
FRED J. GEORGE
BY
Joseph F. Westall
ATTORNEY.

Patented Apr. 2, 1940

2,195,484

UNITED STATES PATENT OFFICE 2,195,484

MOUSE TRAP

Fred J. George, Los Angeles, Calif.

Application August 9, 1937, Serial No. 158,093

12 Claims. (Cl. 43—76)

This invention relates to animal traps, and particularly to the class thereof adapted to ensnare mice, rats and other rodents.

The destructive habits, the disease-germ-carrying proclivities, and the prolificacy of many species of small rodents, have stimulated efforts to produce means to effectively remove this health and property hazard. Many kinds of spring traps have been devised which, while effective in some instances, are adapted to trap but a single animal at each setting of the spring, thus requiring constant attention. Moreover, in many of such devices it is possible to remove the bait without springing the trap, thus eliminating the incentive of the animal to enter upon the tripping mechanism. Conventional devices intended to successively trap or kill a plurality of animals often require the effort of the animals to open a trap door. However, being instinctively wary, undesirable animals will seldom force an entry into a trap.

It is a general object of the present invention to obviate the aforementioned difficulties by the provision of a trap more efficient in operation and requiring a minimum of attention for the successive caging of a plurality of rodents.

It is a specific object of my invention to provide a device comprising a trap chamber and a cage, the former having an unrestricted entry for the admission of the animal and a gate to close the entry actuated by the weight of the animal when in the trap chamber, said cage having a one-way entry from the trap chamber adapted to be opened by the animal in its efforts to escape from the trap chamber, the advancement of the animal from the trap chamber to the cage automatically effecting a resetting of the device for the subsequent trapping of additional animals.

Another object is to provide in a device of the character described, a gravity-operated latch for the gate controlling the entry into the trap to prevent premature reopening of the cage, the latch being adapted for release by the movement of the animal from the trap into the cage in combination with a guard to minimize chance of disengagement of the latch by movement of an animal within the cage.

Another object is to provide boosters actuated by the weight of an animal to urge movement of a suspicious animal at the threshold into the trap and at the entrance of the passage into the cage.

Other objects and salient features of my invention, such for example, as economy and simplicity of construction, durability, and ease and surety of operation, will be apparent to those of skill in the art from an examination of the following description read in the light of the accompanying drawing, in which:

Fig. 1 is a longitudinal sectional view of my invention illustrating the parts as positioned while the trap is set;

Fig. 2 is a plan view of the device of Fig. 1;

Fig. 3 is a section, partially broken away, depicting a gate of the trap closed as when actuated by the weight of an animal confined therein;

Figs. 4 and 5 are enlarged sectional views taken on lines 4—4 and 5—5 of Figs. 3 and 4, respectively. Fig. 6 is a perspective view, partially broken away, illustrating particularly the opening in the partition between the trap chamber and cage, the closure for said opening, and latch for maintaining the closure means in open position.

Referring to the drawing in detail, the numerals of which indicate similar parts throughout the several views, 6 designates the floor, and 7 opposed side walls of an elongated trap. Between the middle and one end of the device, a bait box 8 is provided and comprises an inclosure wall 8a forming three sides of box 8 of a height equal to that of said walls 7. The bottom edge of wall 8a is fastened by well known means to the floor 6 and its side edges engage one of said walls 7. The portion of the last-named wall 7 between the vertical lines thereon at which opposite edges of wall 8a is secured, thus forms the fourth wall of the bait box. The upper edge of the inclosure wall will thus be flush with the upper edge of walls 7. The top of the trap, including the bait box, is preferably covered with a wire mesh 9 over which the animals may crawl, enabling them to see and smell the bait and through which light is admitted into the trap. An angular vertical partition 10, secured to the box 8 at one side of the trap and to the opposed side wall 7, divides the trap into two chambers comprising a cage 11 and a trap chamber 12. Partition 10 comprises a vertical wall 10a having a width approximately equal to half that of floor 6 on which said wall is mounted, and its height is the same as that of side walls 7, whereby wall 10a will be flush with the upper edge of the side walls. Wall 10a is secured at a 90° angle to the wall 7, which is opposed to the wall 7 to which inclosure wall 8a is secured, and is offset with respect to the bait box. A second vertical wall section 10b of partition 10, of the same height as wall 10a, is mounted on floor 6 and connects the vertical edge of the wall 10a, opposite to the edge thereof which is connected to the side wall 7, with the inclosure wall 8a of the bait box.

An oscillating platform 13 conforming substantially to the dimensions of the floor in trap chamber 12 is pivoted transversely in the walls 7 by a transverse pin 14 secured to and laterally extending from the platform. Pin 14 is journalled in side walls 7 closely adjacent the open end 15 of the trap chamber which is opposed to the end thereof formed by partition 10. A plurality of holes 13a are formed in the platform at its innermost end. The weight of the platform is almost equally divided on opposite sides of the pivot 14, there being a slight weight balance of the innermost portion of the platform. A weight 16 may be secured to the underside of the outer end of the platform to compensate for the off-center disposition of the pivot. A gate 17 for the open end 15 of the trap chamber 12 has projecting parallel curved lugs 18 at each side of its bottom edge. On the outside of the lower end of each lug 18, a pin 19 is secured, which laterally extends into the adjacent wall 7 of the trap preferably slightly above the point of pivot of the platform 13. It will be obvious to anyone of skill in the art that lateral projections which are integral with the lugs respectively, may be substituted for the pins 19 if desired. A stop 20 is secured to the walls 7 adjacent its upper edge in a vertical plane between the point of pivot 14 and the edges of the walls 7 at the open end 15 of the trap to prevent the gate 17, when closed by means about to be described, from moving to a vertical position. Thus when the pressure compelling its closure is removed, the gate will open by its own weight. The lower end of gate 17 bears against the outer end of the platform by reason of the curvature of lugs 18, and being heavier than the difference in weight of the portion of the platform at the opposite side of pivot 14, causes the opposite or inner end of the platform to rise. It will be apparent that the gate 17 may be made heavy enough to offset the necessity of the weight 16, thus facilitating construction of the platform from a single piece of material. The gate when opened thus forms a ramp over which a rodent may walk to enter the trap chamber between the walls 7 and thence on the platform.

The weight of the parts is apportioned so that as the rodent passes the line of pivot of the platform, its own weight will cause the innermost end of the platform to drop and, coincidentally, the elevation of the outer end of the platform, which will exert pressure against the bottom of the gate above pins 19 to raise the same. The closure of the gate will tend to urge, by boosting, the rodent, if it has entered the trap slowly, into the trap chamber. As the full weight of the animal is transferred across pivot 14 of the platform, gate 17 is completely closed and releasably latched, by means about to be described, thus holding the platform down. The platform is limited in its oscillatory movement by stops 21 and 22 secured to one of walls 7 in any manner well known in the art.

The trap chamber 12 and cage 11 are communicated through an opening 23 in the upper portion of wall 10b of partition 10. Opening 23 is of a size just large enough for the passage of the animal trapped in chamber 12. A latch to retain the platform in its lowermost position when the trap chamber is occupied comprises an upper horizontal bar 24 journalled over the opening 23 in one wall of the bait box 8 at one end and in a bracket 25, secured by any means well known in the art to the partition 10, at its opposite end. A member 26 hangs from bar 24 and normally gravitates to a vertical position across the opening 23. A latch tongue 27 integrally formed with, and extending laterally from the member 26, swings with the bar and member under the impulse of gravitation through opening 23. A vertical closure plate 28, comprising an upright extension of the side of the innermost end of the platform which is adjacent opening 23, is provided to normally cover the opening, i. e., when the inner end of the platform is up and the trap is set. Simultaneously with the closure of the gate 17, plate 28 will be lowered with the platform 13. As the closure plate is lowered below opening 23, the laterally extending tongue 27 swings partially through the opening under the impulse of the gravitation of member 26 and, over the upper edge of plate with which it engages, thus latching the platform in its lower position and securing the gate in closed position.

Trapped rodents seeking a way of escape from chamber 12 will endeavor to get through opening 23 into the cage 11 and in so doing, push the tongue 27 into the cage, releasing the plate 28. Simultaneously the platform is relieved of the weight of the animal which permits the closure plate 28, to rise in response to gravitation of the gate, tending to urge the animal into the cage. The elevation of the platform accordingly resets the trap chamber, opens the gate and closes the opening 23 by the closure plate 27.

A horizontal member 29 is journalled at its opposite ends in box 8 and bracket 25, respectively, closely adjacent bar 24 to further slightly restrict the opening 23. The member 29 is adapted to be swung clear of the opening in response to the pressure of an animal moving from a trap chamber into the cage. Member 29 minimizes the tendency of animals within the cage, in attempting to return into the trap chamber 12, to displace the latch when the trap chamber is occupied by a later caught rodent.

The outer end of the cage is closed by a perforated door 30 pivoted in the upper portion of the side walls 7 by laterally projecting pins, preferably formed integrally with the door. An indented flange 31 integrally formed with its lower edge to engage the underside of the floor 6. A boss 32 protruding from the floor engages in the indentation to retain the door in closed position while the trap is in operation, but provides facile means for removing the trapped animals.

While I have disclosed but one embodiment of my invention, it will be obvious that numerous changes may be made herein, such, for example, as in the size, shape, proportion, or number of the parts; that the bait box may be dispensed with; and that the entire trap chamber may be composed of perforated metal or mesh or other material well known in the art; all without departing from the spirit of my invention as defined by the appended claims.

What I claim and desire to secure by Letters Patent is:

1. In a trap, an inclosure having an entrance aperture therein, a platform pivoted in said inclosure, a gate for said entrance aperture actuated by said platform, means to divide said inclosure having an opening therein, a closure for said opening actuated by movement of said platform, and means to latch said closure in open position, and means actuated by a trapped animal moving through said opening to release said latch.

2. In a trap, an inclosure comprising a floor and two side walls, a platform within said inclosure pivoted intermediate its ends in said side walls, an outwardly opening gate having a laterally projecting curved lug connected to its lower end, said lug being pivoted in said walls above said platform to bear against the outer end of said platform and urge elevation of the inner end of said platform, and a member having a plurality of holes therein to connect the longitudinal edges of said side walls opposite to the edges thereof connected by said floor.

3. In a trap, an inclosure comprising a floor and two side walls, a partition dividing said inclosure, said partition having an opening therein, a platform, means to pivot said platform intermediate its ends in the side walls of said inclosure, a closure plate for the opening in said partition connected to one end of said platform, and a gate for one end of said inclosure openable by gravitation of the gate and urged to closed position by said platform, said closure plate being normally held in position closing said opening by the weight of said gate.

4. In a trap, an inclosure having an opening in one end, a partition in said inclosure having an opening therein, closure means for the opening in said partition, a gate for the opening in said inclosure having its lower end pivoted in said inclosure adapted to gravitate to open position, and means actuated by gravitation of said gate to urge said closure means to a position closing the opening in said partition.

5. In a trap, walls forming a trap chamber having entrance and exit openings, a gate for said entrance opening opened by gravity, means to close said exit opening movable to closed position by said gate, and means actuated by weight upon it to open said exit opening and close said gate.

6. In a trap, walls forming a trap chamber having entrance and exit openings, a gate for said entrance opening opened by gravity, means to close said exit opening movable to closed position by said gate, means actuated by weight upon it to open said exit opening and close said gate, and means to retain said gate and closure means for said exit opening in closed and open position, respectively.

7. In a trap, walls forming a trap chamber having an entrance opening therein, and walls forming a cage having an opening from said trap chamber, a gate to close said entrance opening, means to close said opening of said cage, said last-named means being movable to closed position by gravitation of said gate, latching means to hold said gate closed, and means to shield said latching means from said cage.

8. In a trap, an inclosure having an opening therein, a gate for said opening, a partition in said inclosure forming two chambers therein, said partition having an opening therein, closure means for said opening, means to latch said closure means in open position, and means to urge an animal trapped in one of said chambers through said opening into other of said chambers.

9. In a trap, an inclosure having an opening therein, a gate for said opening, a partition in said inclosure forming two chambers therein, said partition having an opening therein, closure means for said opening, and means to latch said closure means in open position and said gate in closed position, respectively, and means in the path of an animal moving from one of said chambers to the other of said chambers to release said latch.

10. In a trap, an inclosure having an entrance and an exit opening therein, an outwardly opening gate for said entrance opening adapted to gravitate to open position, closure means for said exit opening, means connecting said closure means with said gate, said last named means actuated by gravitation of said gate to its open position to close said closure means.

11. In a trap, an inclosure having an entrance and an exit opening, a gate for said entrance opening, and latching means for said gate having a trigger in said exit opening for release of said latching means.

12. In a trap, an inclosure having an entrance and an exit opening, a gate for said entrance opening, latching means for said gate having a trigger in said exit opening for release of said latching means, and displaceable means for restricting the exit opening.

FRED J. GEORGE.